(12) United States Patent
Chen et al.

(10) Patent No.: US 7,571,078 B2
(45) Date of Patent: *Aug. 4, 2009

(54) TIME DEPENDENT PROCESS PARAMETERS FOR INTEGRATED PROCESS AND PRODUCT ENGINEERING

(75) Inventors: Martin Chen, Los Gatos, CA (US); Shailesh P. Mane, San Jose, CA (US); Gaurav Sharma, San Jose, CA (US); Qi Wang, Cupertino, CA (US); Dallan Clancy, Belmont, CA (US); Mario Günter Rothenburg, Eppelheim (DE); Uwe Kohler, Dielheim (DE)

(73) Assignee: SAP AG, Walldorf (DE)

( * ) Notice: Subject to any disclaimer, the term of this patent is extended or adjusted under 35 U.S.C. 154(b) by 808 days.

This patent is subject to a terminal disclaimer.

(21) Appl. No.: 10/851,361

(22) Filed: May 20, 2004

(65) Prior Publication Data

US 2005/0261888 A1 Nov. 24, 2005

(51) Int. Cl.
*G06F 17/10* (2006.01)
(52) U.S. Cl. ......................................................... 703/2
(58) Field of Classification Search ................ 703/2
See application file for complete search history.

(56) References Cited

U.S. PATENT DOCUMENTS

| | | | |
|---|---|---|---|
| 5,191,534 A | 3/1993 | Orr et al. | |
| 5,737,728 A | 4/1998 | Sisley et al. | |
| 5,859,964 A * | 1/1999 | Wang et al. | 714/48 |
| 5,966,527 A * | 10/1999 | Krivokapic et al. | 703/14 |
| 6,304,836 B1 * | 10/2001 | Krivokapic et al. | 703/14 |
| 6,871,182 B1 | 3/2005 | Winnard et al. | |
| 6,928,396 B2 | 8/2005 | Thackston | |
| 7,069,101 B1 | 6/2006 | Arackaparambil et al. | |
| 7,103,434 B2 | 9/2006 | Chernyak et al. | |
| 7,162,318 B1 | 1/2007 | Brearley et al. | |
| 7,171,344 B2 | 1/2007 | Lind | |
| RE39,534 E * | 3/2007 | Cooperberg et al. | 700/28 |
| 7,280,990 B2 | 10/2007 | Turner et al. | |
| 2005/0021164 A1 | 1/2005 | Surholt et al. | |
| 2005/0138021 A1 | 6/2005 | Santoso et al. | |
| 2005/0138160 A1 | 6/2005 | Klein et al. | |
| 2005/0144150 A1 | 6/2005 | Ramamurthy et al. | |
| 2005/0159997 A1 | 7/2005 | John | |
| 2005/0216372 A1 | 9/2005 | Hessedenz | |

OTHER PUBLICATIONS

SAP Advanced Planner and Optimizer—Supply Chain Cockpit; 1999; pp. 1-9.*

(Continued)

*Primary Examiner*—Hugh Jones
(74) *Attorney, Agent, or Firm*—Kenyon & Kenyon LLP

(57) ABSTRACT

A method and apparatus for computer modeling the production process is disclosed. An integrated product and process engineering system may be a computer modeling system that models both a generic production process and a specific individual production process. The integrated product and process engineering system may store a time dependent process parameter related to the specific product design and organize the time dependent process parameters by product variants. The time dependent process parameter may have a parameter value and a start time. The time dependent process parameters may be input/output component consumption parameters, activity duration parameters, resource capacity consumption parameters, and activity scrap parameters.

24 Claims, 5 Drawing Sheets

OTHER PUBLICATIONS

SAP Advanced Planner and Optimizer—Demand Planning; 1999; pp. 1-13.*

Drozda et al.: Tool and Manufacturing Engineers Handbook vol. vii Continuous Improvement; pp. 11-1 to 11-4, 11-6; Sep. 1993, Society of Manufacturing Engineers.*

"SAP Supply Chain Management 2007" Published by SAP (Assignee) in 2007; three pages (title page, p. 6, end page); obtained from: download.sap.com/solutions/business-suite/brochures/download.epd?.*

SAP Advanced Planner and Optimer (SAP APO), Release 3.1, Release Notes, pp. I-VIII; pp. 1-117; Copyright 2002 SAP AG.

Release notes 4.6C; Structure Changes in the SAP Reference IMG in Release; http://help.sap.com/saphelp_46c/helpdata/en/b5/37aa38c1798b1be10000009b38f8cf/frameset.htm.

SAP, Functions in Detail—SAP Advanced Planner & Optimizer, "Supply Network Planning and Deployment", Dec. 1999, 17 pages.

Glovia.com, "Engineering Change", Created Mar. 6, 2002, Glovia International, 1940 E. Mariposa, El Segundo, CA 90245-3457, 3 pages.

User Name: US Patent & Trademark Office, Book—"Oracle Developer Forms Techniques", http://proquest.safaribooksonline.com; 17 pages, 2000.

Yoon-Eui Nahm and Haruo Ishikawa, CE Concurrent Engineering: Research and Applications; "Integrated Product and Process Modeling for Collaborative Design Environment", Department of Mechanical Engineering and Intelligent Systems, The University of Electro-Communications, 1-5-1 Chofugaoka, Chofu-shi, 182-8585, Tokyo, Japan, vol. 12, No. 1, Mar. 2004, Copyright 2004 Sage Publications; pp. 5-23.

Nanua Singh, "Integrated Product and Process Design: A Multi-Objective Modeling Framework", Robotics and Computer Integrated Manufacturing 18 (2002) pp. 157-168, Copyright 2002 Published by Elsevier Science Ltd.

* cited by examiner

TIME DEPENDENT PROCESS PARAMETERS FOR INTEGRATED PROCESS AND PRODUCT ENGINEERING

CROSS REFERENCE TO RELATED APPLICATIONS

This application is related by common inventorship and subject matter to co-filed and co-pending applications titled "Interfaces from External Systems to Time Dependent Process Parameters in Integrated Process and Product Engineering" and "Time Dependent Process Parameters and Engineering Change Number Conflict Report", filed May 20, 2004. Each of the aforementioned applications is incorporated herein by reference in its entirety.

TECHNICAL FIELD OF THE INVENTION

The present invention pertains to a computer modeling system for modeling a production process. More-particularly, the present invention pertains to storing time dependent process parameters within the computer modeling system.

BACKGROUND INFORMATION

Supply network planning (SNP) computer-modeling applications are used to plan out the production, or manufacturing, process for a product. SNP computer-modeling is typically only performed once a design for the product is finalized and all necessary specific component parts have been chosen. The planning horizon is usually from six to eighteen months, or even longer. The planning parameters used are usually not constant during the planning horizon. The changing values of planning parameters may adversely affect the quality and accuracy of the SNP runs over time.

An example of the changing values of these planning parameters is illustrated in the graph of FIG. 1. As shown in FIG. 1, when a new semiconductor product is introduced for production, the beginning yield rate is usually low. Then upon mastering the production process used, the yield rate may improve significantly over time. The targeting yield rates may change quarterly or even monthly. Therefore, using a fixed value representing the yield may adversely affect the ability of planners to properly forecast needed supplies or materials due to over-planning or under-planning.

SUMMARY OF THE INVENTION

A method and apparatus for computer modeling the production process is disclosed. An integrated product and process engineering system may be a computer modeling system that models both a generic production process and a specific individual production process. The integrated product and process engineering system may store a time dependent process parameter related to the specific product design and organize the time dependent process parameters by product variants. The time dependent process parameter may have a parameter value and a start time. The time dependent process parameters may be input/output component consumption parameters, activity duration parameters, resource capacity consumption parameters, and activity scrap parameters.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

An integrated product and process engineering (IPPE) system may be a computer modeling system that models both a generic production process and a specific individual production process. The IPPE system may store a time dependent process parameter (TDPP) related to the specific product design and organize the TDPPs by specific product variants. The TDPP may have a parameter value and a start time. The TDPPs may be input/output component consumption parameters, activity duration parameters, resource capacity consumption parameters, and activity scrap parameters.

Figure 1:
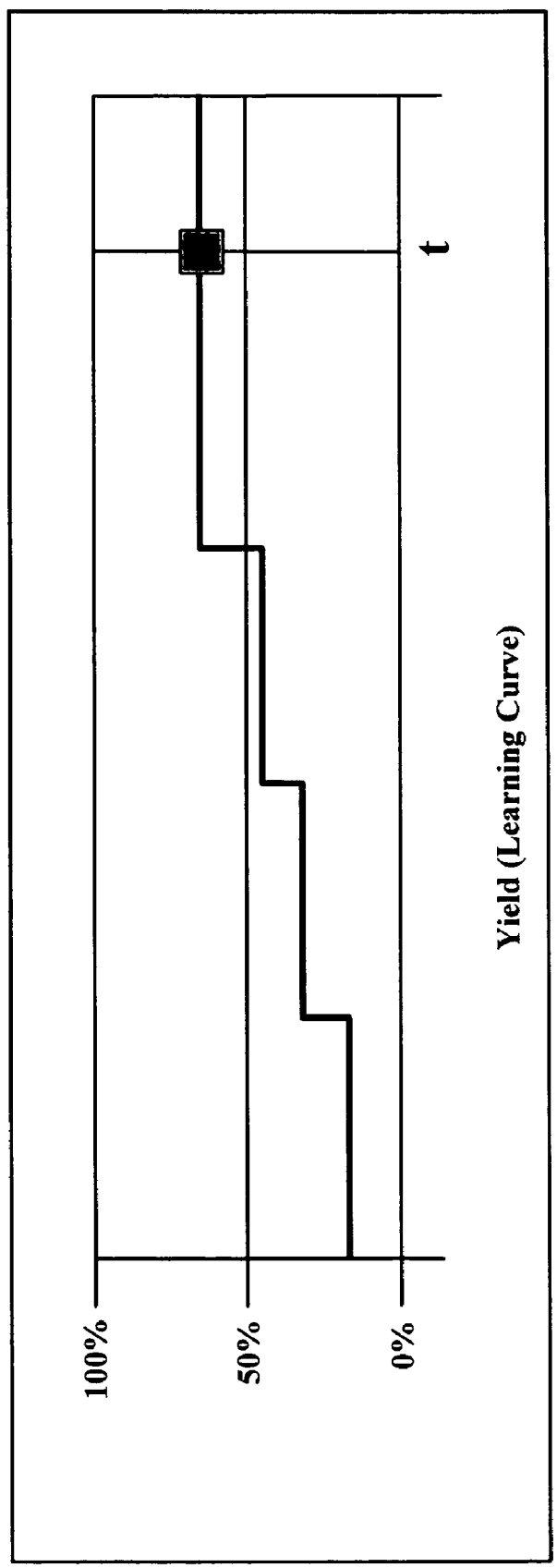
FIG. 1 illustrates the changing values of planning parameters in a graph form.
Figure 2:
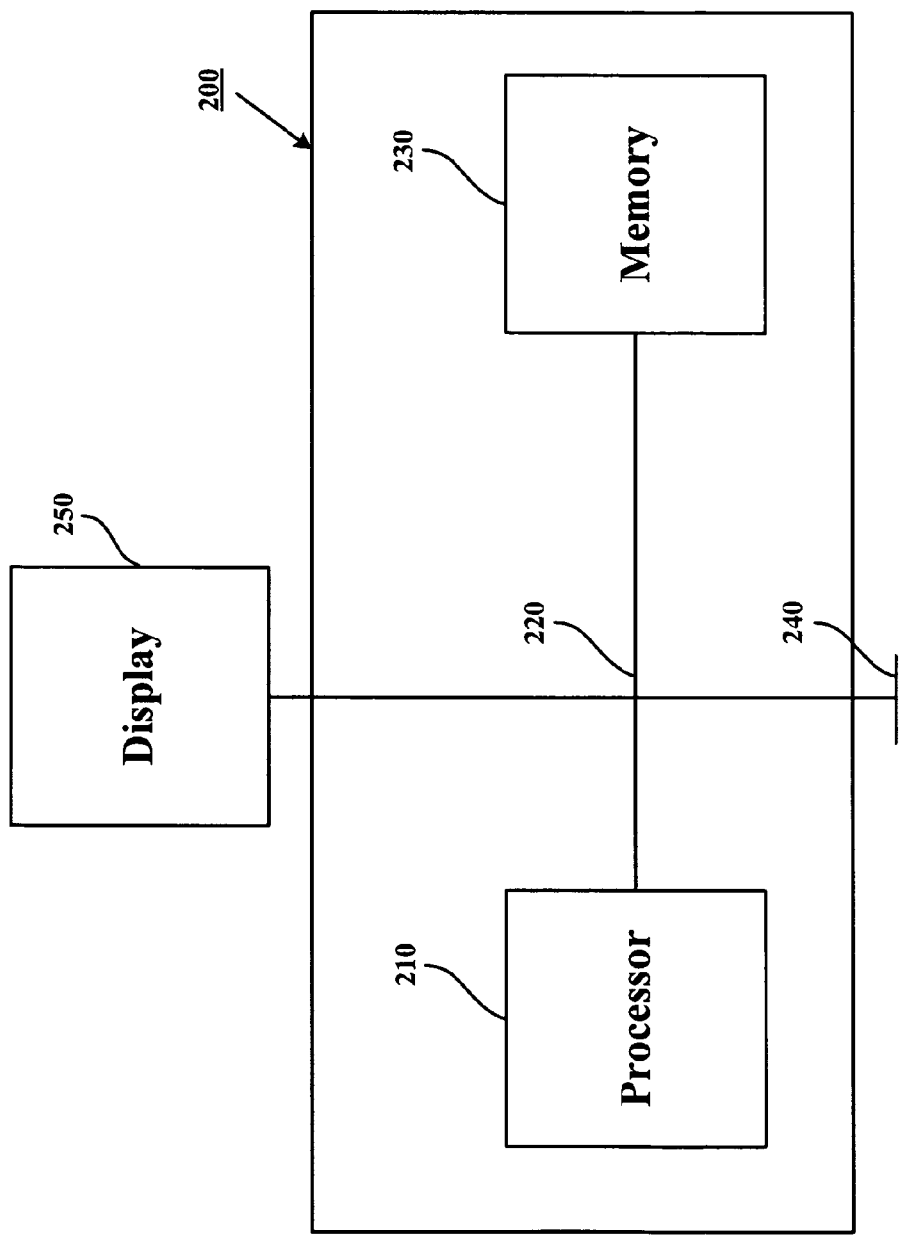
FIG. 2 illustrate in a block diagram one embodiment of a computer modeling system that may be used to implement the present invention.

FIG. 2 is a block diagram of one embodiment of a computer modeling system that may be used to implement the present invention. A computer modeling system 200 may include processor 210 connected by a bus 220 to a memory 230. The processor 210 can be any type of processor capable of executing software or other computer code, such as a microprocessor, digital signal processor, microcontroller, or the like. The computer modeling system 200 can be a personal computer (PC), mainframe, handheld device, portable computer, set-top box, or any other system that implements software or other computer code.

The memory 230 can be a hard disk, a floppy disk, random access memory (RAM), read only memory (ROM), flash memory, or any other type of machine medium readable by processor 210. The memory 230 can store instructions for performing the execution of the various method embodiments of the present invention such as methods shown in FIG. 5. The processing system 200 may also have an interface 240 for the input and output of data and a display 250 to display the data.

The production process may be modeled on an IPPE system. Various nodes may be set up to represent raw materials needed to make finished goods, actions that must be performed during the production process, and tools and devices that may be used to perform those actions. The IPPE system may represent the relationships between those nodes, and used to calculate further nodes and parameters. Designing a production process for manufacturing a new product may be given greater flexibility by first creating a generic production process model before creating a specific production process model. The generic production process model may use abstracts of the different raw materials, actions, and tools without getting into specifics required by the design of the product. Once the specific design of the product is in place, a more specific production process model may be designed using the generic production process model. For example, a generic production process model for a manufacturing a computer may include generic representations of the hard drive, processor, and other parts, while the specific production process model may specify the type and brand of hard drive and processor needed to produce the specific computer design.

An IPPE engine is a software tool that allows for modeling both a generic production process and a specific individual production process. The IPPE may be run on any type of processing system, such as the computer modeling system 200 shown in FIG. 2. TDPPs may be used to represent those facets of the production process that have a value that may change over time, either due to improvements in the production process or for other reasons.

Figure 3:
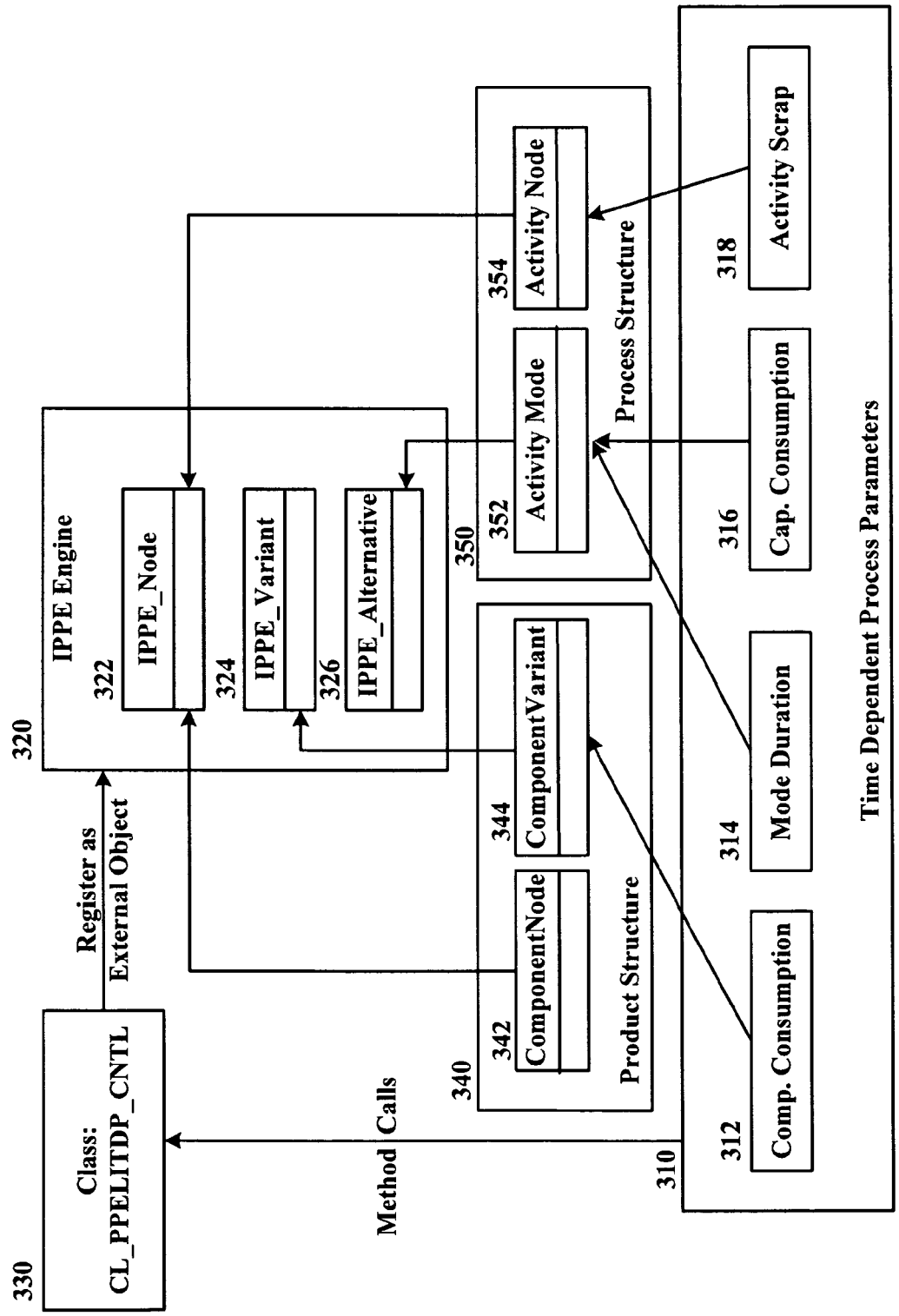
FIG. 3 illustrates in a block diagram one embodiment of the implementation of TDPP in an IPPE architecture according to the present invention.

FIG. 3 illustrates one embodiment of the implementation of TDPP in an IPPE architecture. The TDPPs 310 may be implemented as external objects to the IPPE engine 320 that performs the modeling of the production process. A new global class 330 may be created for the TDPPs 310 which will be registered with the IPPE as an external object. This global class 330 may contain the TDPP data. The TDPP data may include a parameter value and a date and time when the parameter value is in effect. This class 330 may also be used to implement existing interfaces that will allow the class to use method calls to save, copy, and delete TDPP data.

TDPPs may include input/output component consumption 312, activity duration 314, resource capacity consumption 316, and activity scrap 318. For example, input/output component consumption 312 may be the amount of raw materials needed to manufacture a finished product. Activity duration 314 may be the length of time needed to manufacture a finished product. Resource capacity consumption 316 may be tools and other items needed to manufacture a finished product. Activity scrap 318 may be the leftover waste produced during the manufacturing process. Other TDPPs may be added to the system as required to model the production process.

The IPPE engine 320 may interact with IPPE node data 322, IPPE variant data 324, and IPPE alternative data 326. An IPPE node is the subordinate term for all nodes that may exist in an IPPE environment. The IPPE nodes 322 represent general components and functions of the product, such as product structures 340, process structures 350, factory layouts, IPPE line designs, color schemes, or production resources. The product structures 340 may include component node data 342 and component variant data 344 and process structures 350 may include activity mode data 352 and activity node data 354. The IPPE nodes may be given different types to regulate their different aspects and attributes. For example, an IPPE node may be assigned a component node type 342 to represent product components or functions, a color node type to represent colors, an activity node type 354 to represent the process structure, a factory layout node type to represent factory layout functions, and resource node types to represent production resources. The node types may also be assigned a level, such as access level, view level, or structure level. This assignment may determine whether the node is the header of a structure, gives a view of a structure, or is part of a structure.

IPPE variant data 324 may be a concrete instance of an IPPE node. IPPE variants 324 may be created and edited at nodes of the product structure or at color nodes. Component variant data 344, a type of IPPE variant data 324, is a format for displaying the product structure for products that have many variants. The product variant structure is particularly suited to products that consist of a large number of individual materials and products that are made-to-order and configured-to-order.

IPPE alternative data 326 may represent alternative assemblies of a part that is to be produced. An IPPE alternative 326 groups together several relationships that point to subordinate nodes. IPPE alternatives 326 exist at structure nodes in the product structure or process structure. In the process structure, alternative nodes may define how and where an activity is executed. Activity mode data 352, a type of IPPE alternative data, may define how and where an activity is to be executed. The activity mode 352 may give a detailed description of how the activity is to take place. Several modes may be created for each activity.

The TDPPs 310 may be extensions of existing product structures 340 and process structures 350. Component consumption TDPP data 312 are extensions of component variant data 344. Mode duration TDPP data 314 and resource capacity consumption 316 are extensions of activity mode data 352. Activity scrap TDPP data 318 are extensions of activity node data 354.

Figure 4:
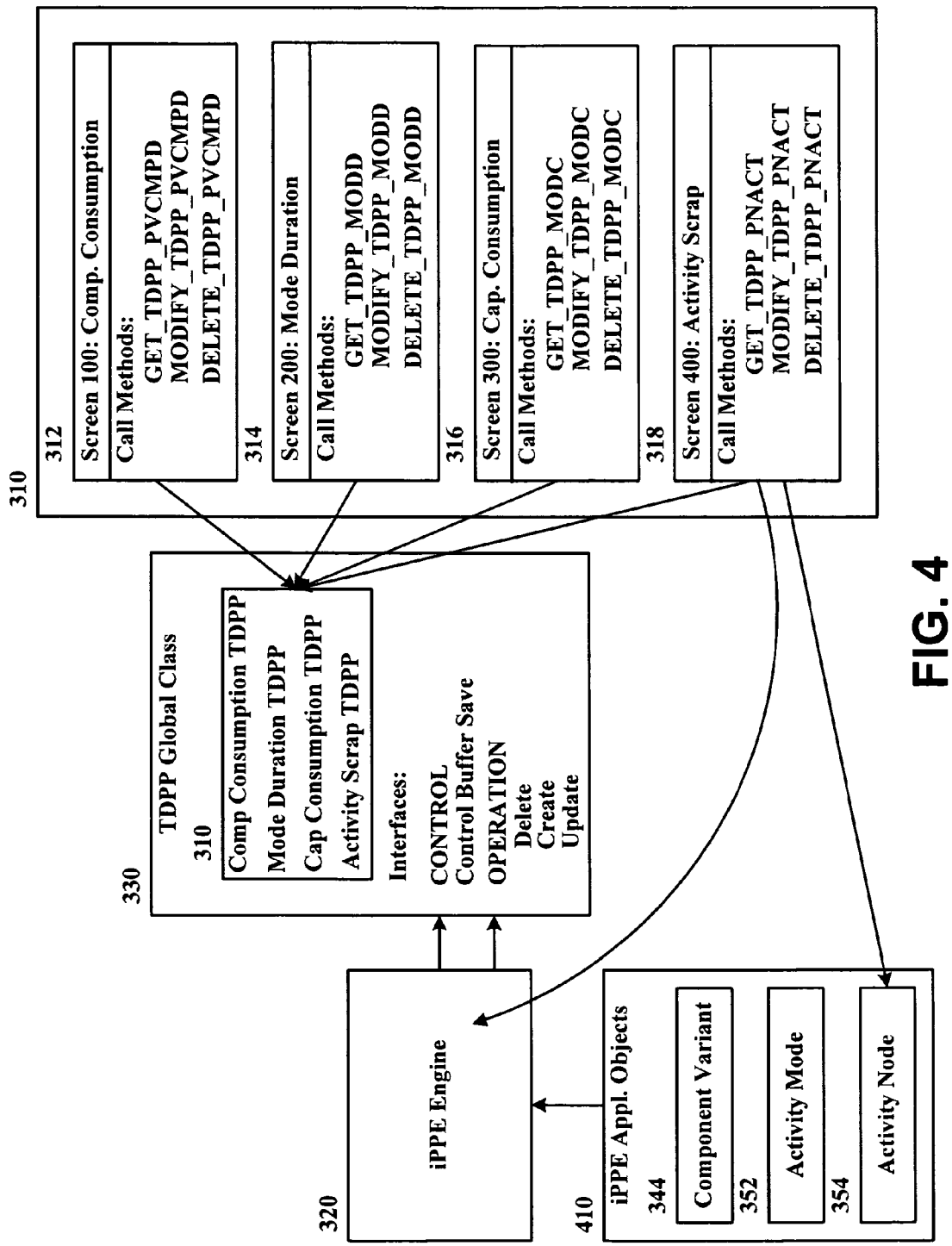
FIG. 4 illustrates in a block diagram one embodiment of the interactions with the IPPE engine according to the present invention.

FIG. 4 illustrates one embodiment of the interactions between the IPPE engine 320, the existing IPPE objects 410, the TDPP global class 330, and the TDPP function group 310. The IPPE engine 320 uses the TDPP global class 330 to create instances of the TDPP data, along with the TDPP function group 310, for whatever TDPP data type is needed. The TDPP global class 330 may include functions for creating, deleting, and modifying the stored TDPP data, in addition to other possible functions. The TDPP data appears to the IPPE engine 320 as a standard IPPE application object, such as component variant data 344 for TDPP component consumption data 312, activity mode data 354 for TDPP mode duration data 314 and TDPP capacity consumption data 316, and activity node data 354 for TDPP activity scrap data 318.

Figure 5:
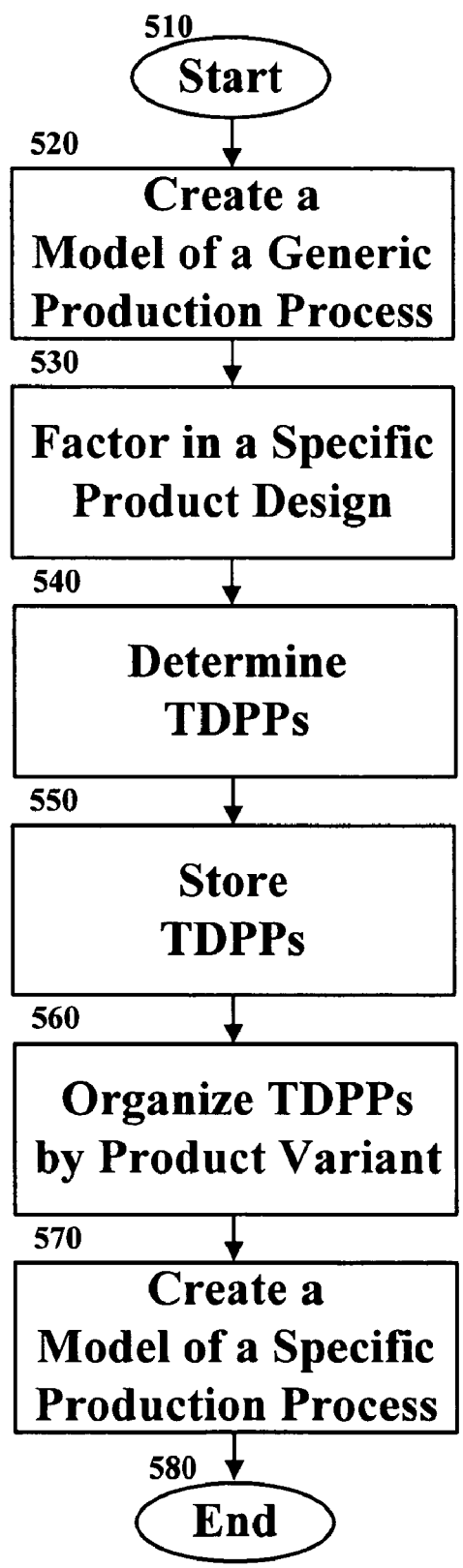
FIG. 5 illustrates in a flowchart one embodiment of the modeling performed by the IPPE engine according to an embodiment of the present invention.

FIG. 5 illustrates in a flowchart one embodiment of the modeling performed by the IPPE engine 320. The IPPE engine 320 starts (Block 510) by creating a generic model of a generic production process for producing a product (Block 520). The IPPE engine may then factor in a specific product design into the model (Block 530). The IPPE engine 320 may then determine the TDPPs resulting from that specific product design (Block 540). Alternatively, the TDPPs may be provided by some source external to the computer modeling system, calculated by the user and inputted into the system, or provided by some other method known in the art. The IPPE engine 320 may store the TDPPs related to the specific product design in the storage memory 230 (Block 550). In one embodiment, the IPPE engine 320 may organize the TDPPs by product variant (Block 560). A product variant may be a set of the products that include some minor alteration to the product that does not rise to the level of an improvement of the design of the product. For example, a product may come in a variety of colors that require different times to apply, so the activity duration TDPP for each colored product would be different. The IPPE engine 320 may then create a specific model of the specific individual production process for that specific product design using the TDPPs and the generic model, among other factors, (Block 570), ending this phase of the modeling process (Block 580).

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

The invention claimed is:

1. A method of modeling a production process using an integrated product and process engineering (IPPE) system, the method comprising:

creating, by an IPPE engine executed by a processor of the IPPE system, a generic model of a generic production process for a generic product design of a product; and creating, by the IPPE engine, a specific individual model of a specific individual production process for a specific product design of the product using the integrated product and process engineering system, wherein:
the specific individual model is based on the generic model;
the specific individual model includes a time dependent process parameter;
the time dependent process parameter is stored by the IPPE engine in a data storage device of the IPPE system; and
the time dependent process parameter is one of an input/output component consumption time dependent process parameter, an activity duration time dependent process parameter, a resource capacity consumption time dependent process parameter, and an activity scrap time dependent process parameter,
wherein input/output component consumption time dependent process parameters are extensions of component variant data used by the integrated product and process engineering system;
activity duration time dependent process parameters and resource capacity consumption time dependent process parameters are extensions of activity mode data used by the integrated product and process engineering system; and
activity scrap time dependent process parameter are extensions of activity node data used by the integrated product and process engineering system.

2. The method of claim 1, wherein the time dependent process parameter has a parameter value and a start time.

3. The method of claim 1, further comprising determining the time dependent process parameter based on the generic model.

4. The method of claim 1, further comprising:
storing in a memory multiple time dependent process parameters related to the specific product design of the product;
organizing the multiple time dependent process parameters by product variant.

5. A method of modeling a production process using an integrated product and process engineering (IPPE) system, the method comprising:
creating, by an IPPE engine executed by a processor of the IPPE system, a generic model of a generic production process for a generic product design of a product; and
creating, by the IPPE engine, a specific individual model of a specific individual production process for a specific product design of the product using the integrated product and process engineering system, wherein:
the specific individual model is based on the generic model;
the specific individual model includes a time dependent process parameter;
the time dependent process parameter is stored by the IPPE engine in a data storage device of the IPPE system; and
the time dependent process parameter is stored as an instance of a global class with functions to create, delete, or modify the time dependent process parameter.

6. The method of claim 5, wherein the time dependent process parameter has a parameter value and a start time.

7. The method of claim 5, further comprising determining the time dependent process parameter based on the generic model.

8. The method of claim 5, further comprising:
storing in a memory multiple time dependent process parameters related to the specific product design of the product;
organizing the multiple time dependent process parameters by product variant.

9. A storage medium storing a set of instructions adapted to be executed by a processor to implement a method for processing data, the method comprising:
creating, by an integrated product and process engineering (IPPE) engine executed by a processor of an IPPE system, a generic model of a generic production process for a generic product design of a product; and
creating, by the IPPE engine, a specific individual model of a specific individual production process for a specific product design of the product using the integrated product and process engineering system, wherein:
the specific individual model is based on the generic model;
the specific individual model includes a time dependent process parameter;
the time dependent process parameter is stored by the IPPE engine in a data storage device of the IPPE system; and
the time dependent process parameter is one of an input/output component consumption time dependent process parameter, an activity duration time dependent process parameter, a resource capacity consumption time dependent process parameter, and an activity scrap time dependent process parameter,
wherein input/output component consumption time dependent process parameters are extensions of component variant data used by the integrated product and process engineering system;
activity duration time dependent process parameters and resource capacity consumption time dependent process parameters are extensions of activity mode data used by the integrated product and process engineering system; and
activity scrap time dependent process parameter are extensions of activity node data used by the integrated product and process engineering system.

10. The storage medium of claim 9, wherein the time dependent process parameter has a parameter value and a start time.

11. The storage medium of claim 9, further comprising determining the time dependent process parameter based on results of modeling the generic production process.

12. The storage medium of claim 9, further comprising:
storing in a memory multiple time dependent process parameters related to the specific product design of the product;
organizing the multiple time dependent process parameters by product variant.

13. A storage medium storing a set of instructions adapted to be executed by a processor to implement a method for processing data, the method comprising:
creating, by an integrated product and process engineering (IPPE) engine executed by the processor of an IPPE system, a generic model of a generic production process for a generic product design of a product; and
creating, by the IPPE engine, a specific individual model of a specific individual production process for a specific product design of the product using the integrated product and process engineering system, wherein:
the specific individual model is based on the generic model;
the specific individual model includes a time dependent process parameter;
the time dependent process parameter is stored by the IPPE engine in a data storage device of the IPPE system; and the time dependent process parameter is stored as an instance of a global class with functions to create, delete, or modify the time dependent process parameter.

14. The storage medium of claim 13, wherein the time dependent process parameter has a parameter value and a start time.

15. The storage medium of claim 13, further comprising determining the time dependent process parameter based on results of modeling the generic production process.

16. The storage medium of claim 13, further comprising:
storing in a memory multiple time dependent process parameters related to the specific product design of the product;
organizing the multiple time dependent process parameters by product variant.

17. An integrated product and process engineering system, comprising:
a processor that runs a program creating a generic model of a generic production process for a generic product design of a product and a specific individual model of a specific individual production process for a specific product design of the product based on the generic model; and
a memory that stores the specific individual model including a time dependent process parameter,
wherein the time dependent process parameter is one of a input/output component consumption time dependent process parameter, an activity duration time dependent process parameter, a resource capacity consumption time dependent process parameter, and an activity scrap time dependent process parameter, and
wherein input/output component consumption time dependent process parameters are extensions of component variant data;
activity duration time dependent process parameters and resource capacity consumption time dependent process parameters are extensions of activity mode data; and activity scrap time dependent process parameter are extensions of activity node data.

18. The integrated product and process engineering system of claim 17, wherein the time dependent process parameter has a parameter value and a start time.

19. The integrated product and process engineering system of claim 17, wherein the time dependent process parameter is based on the generic model.

20. The integrated product and process engineering system of claim 17, wherein the memory stores multiple time dependent process parameters related to the specific product design of the product and organizes the multiple time dependent process parameters by product variant.

21. An integrated product and process engineering system, comprising:
a processor that runs a program creating a generic model of a generic production process for a generic product design of a product and a specific individual model of a specific individual production process for a specific product design of the product based on the generic model; and
a memory that stores the specific individual model including a time dependent process parameter,
wherein the time dependent process parameter is stored as an instance of a global class with functions to create, delete, or modify the time dependent process parameter.

22. The integrated product and process engineering system of claim 21, wherein the time dependent process parameter has a parameter value and a start time.

23. The integrated product and process engineering system of claim 21, wherein the time dependent process parameter is based on the generic model.

24. The integrated product and process engineering system of claim 21, wherein the memory stores multiple time dependent process parameters related to the specific product design of the product and organizes the multiple time dependent process parameters by product variant.

* * * * *

UNITED STATES PATENT AND TRADEMARK OFFICE
CERTIFICATE OF CORRECTION

PATENT NO. : 7,571,078 B2
APPLICATION NO. : 10/851361
DATED : August 4, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Seventh Day of September, 2010

David J. Kappos
*Director of the United States Patent and Trademark Office*